Figure 1:
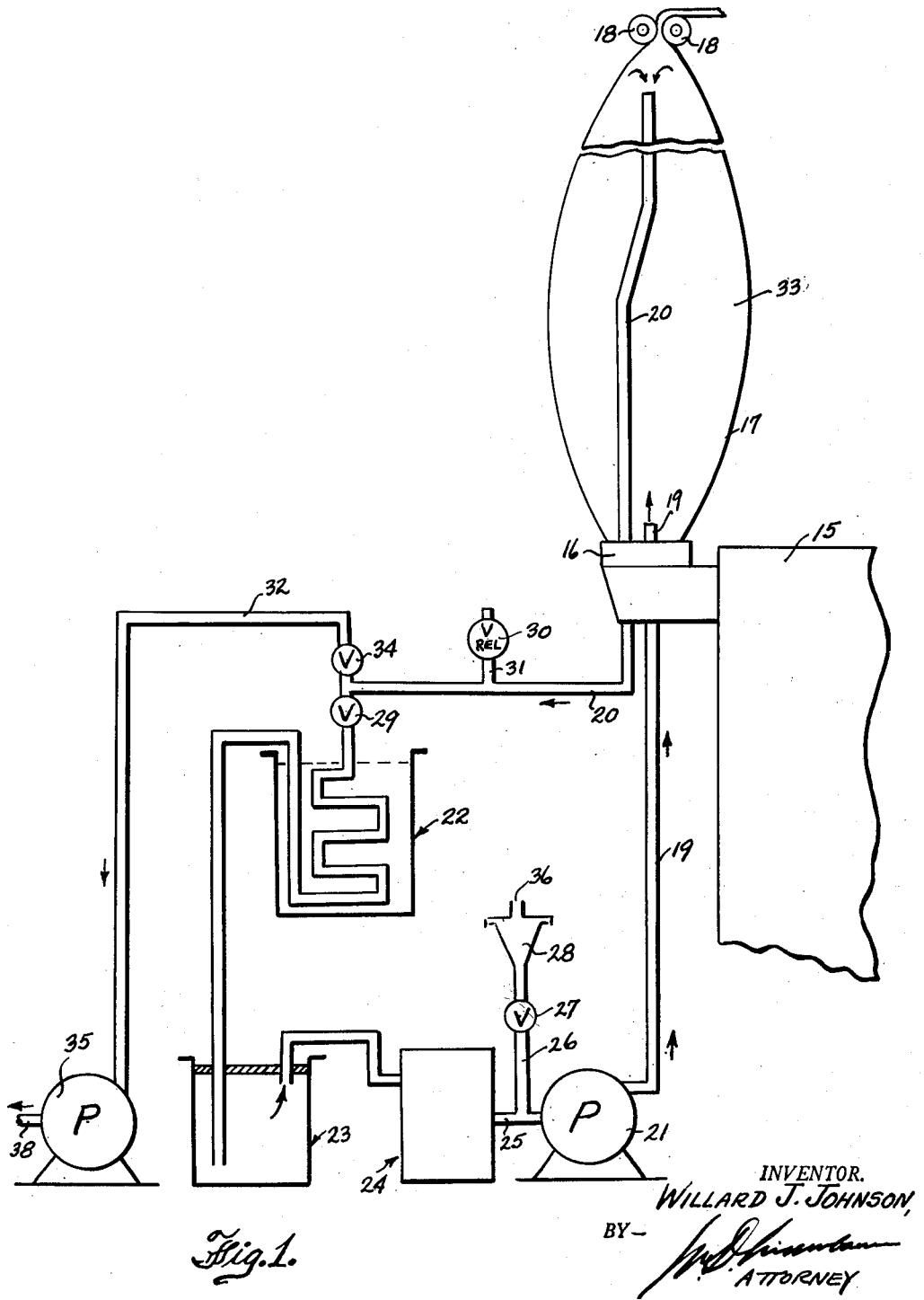

Patented Feb. 9, 1954

2,668,323

UNITED STATES PATENT OFFICE 2,668,323

MEANS FOR TREATING THE INTERIOR SURFACE OF TUBING BEING EXTRUDED

Willard J. Johnson, Midland Park, N. J., assignor of one-third to Louis Danenberg and one-third to Alex Danenberg, Long Island City, N. Y.

Application December 12, 1951, Serial No. 261,282

1 Claim. (Cl. 18—14)

The present invention relates to the extrusion of plastic tubing and more particularly to dealings with such tubing immediately as it leaves the discharge orifice of the extrusion die.

The tubing herein concerned with principally, is thin-walled and of pliable material, as for instance is used in the manufacture of bags or sleeves for packaging purposes. It is common practice to make such tubing by extruding a comparatively thick-walled, small diameter tubing and causing it to stretch to a larger diameter of predetermined size by inflating the tubing before the extruded material has set. The finished tubing is pressed flat between pressure rollers some distance from the extrusion die, where such tubing enters between such rollers and at such position may be deemed closed against passage of air. Air under pressure is maintained in the length of tubing between the die and said rollers, to cause inflation of the tubing while the latter is still in plastic state from the die. A large "bubble" of air is thus cached. Such confined air as the tube is running, becomes laden with free plasticizer substance and becomes very hot. Such condition rather aids continuance of the adhesive character of the inside surface of the tubing, which is objectionable because when the tubing is flattened at the pressure rollers, its plies stick to one another. Also such laden air effects color and transparency of the tubing, if the nature of the extruded substance is to lend color and transparency to the finished tubing.

It is therefore one of the objects of this invention, to provide a novel and improved means to inflate such tubing for the purpose described, and yet keep the "bubble" from becoming stagnant.

Another object hereof is to provide a novel and improved apparatus to keep on changing the air confined within the tube, which air is there to cause inflation of, and thereby to stretch said tube laterally.

A further object of this invention is to provide novel and improved means to cause said cached air to continuously circulate, remain cool and clear, and rid the tube's interior of any free objectionable substance, so that when the extruded tubing reaches and passes through the rollers which flatten said tubing, the plies of such tubing will not stick to each other.

A further object hereof is to provide novel and improved means to accomplish the above mentioned benefits and give a desired coating which is either of ornamental or protective nature to the interior surface of the tubing as it is being extruded.

Still another object of this invention is to provide novel and improved means of the nature set forth which is reasonably cheap, easy to use and control and efficient in carrying out the purposes for which it is designed.

Other objects and advantages will become apparent as this disclosure proceeds.

In the accompanying drawing forming part of this specification, Fig. 1 is a diagrammatic representation of apparatus embodying the teachings of this invention.

In the drawing, the numeral 15 designates an extruder which discharges plasticized material through the die 16 forming tubing 17. Such extruded tubing when in set condition is of pliable material. Hence at sufficient distance from said die 16, where the tubing is in set condition, said tubing is completely flattened by being passed through a pair of pressure rollers 18, and from there, to a wind-up device or directly to a machine for working on such flattened tubing. Pipes 19 and 20 extend from exterior the die 16, through said die and into the tubing 17 being extruded. The pipe 19 affords a passage into the extruded tubing, for air under pressure or other media under pressure supplied by a pump 21, so that the tubing before it sets, is inflated and thus stretched to a predetermined diameter which is greater than the diameter of the tubing extruded at the mouth of the die 16. The pipe 20 affords a passage leading out of said extruded tubing.

The air mass contained in the extruded tubing 17, between the mouth of the die 16 and the closure afforded by the pressure rollers 18, is called the cached "bubble." Air can escape from such bubble 33, through the pipe 20, from where it passes through a cooling device 22, then through a moisture trap 23, then through a filter 24 and thence into the intake pipe 25 of the pump 21. This intake pipe 25 has a branch 26 which is controlled by a valve 27. Said branch 26 may terminate in a hopper 28, whose use will be explained later herein. The intake port of the cooling device 22, may be controlled by a valve 29. In order that the pressure existing within the bubble does not exceed a prescribed limit, a pressure controlled valve 30 is provided, holding normally closed a branch 31 in pipe 20; such branch 31 being connected to said pipe 20, intermediate valve 29 and the entrance of said pipe 20 into the die 16.

Instead of circulating the air within the bubble 33, through the system thus far described, it can be led from pipe 20 to escape into the atmosphere. For such purpose said pipe 20 has the branch 32 controlled by the valve 34. This branch 32 may be open, or lead to an exhaust pump 35, which when operating, draws air from said bubble 33, upon proper setting of the valves.

When valve 34 is closed, and valve 29 is either open or omitted from the system, pipe 20 may be deemed as directly connected to the cooling device 22. In such instance we may disregard the presence of the exhaust pump 35. It is evident that the system remaining, with pressure pump 21 in operation, would effect circulation of the air bubble 33, and such air in circulation would be cooled in its passage through the cooling device 22. Any condensate therein would remain in the trap 23. Then such air in its passage would be filtered by filter 24 to remove any foreign matter carried along by such moving air, and finally the cooled, condensate-freed and filtered air would again enter the pump 21 to be forced back into the bubble space within the tubing 17 being extruded. The valve 27 may be open to proper degree for the replenishment of any air lost in operation.

Instead of air as the cooling media for the extruded tubing, steam or water-laden air or other gaseous media may be used, by introduction of same at 36 to the intake of the pressure pump 21. If desired, the interior of the tubing 17 may be given a protective or decorative coating, by the introduction of proper solutions, coloring matter, powdered bronze or pearl essence particles, as matter of example, through the pump intake from the hopper 28.

When the valve 29 is closed, and valve 34 is either open or omitted from the system, pipe 20 may be deemed as directly connected to the pipe 32. In such instance we may disregard the presence of the cooler 22, the trap 23 and the filter 24, and intake pipe 25 shall be deemed as directly connected to the pipe 26. Now with valve 27 open and both pumps 21 and 35 operating, the air in the bubble 33 will be changed because it would be withdrawn by action of exhaust pump 35 and a new supply of air under pressure will be supplied by the pump 21. The pump 35 should be operated for comparatively slow withdrawal of air quantity. Either the speed at which such pump 35 is run or else the valve 34 may be adjusted to accomplish this. Pump 35 may be omitted in this instance, and only valve 34 be used to control escape of air from the bubble 33, in order to accomplish change of air in the bubble. Regardless of which manner is used to cause change of the air in the said bubble 33, the coating of the interior of the extruded tubing 17 can be carried on as set forth. When the pump 35 is not used, and it is included in the system, its rotor at rest, is set so that air may escape from pipe 32 out through exhaust pipe 38.

In the set-up shown in Fig. 1, it is evident that any of the systems of operation can be selected, and that if only one particular way of practicing this invention to change the air of the air bubble 33 is desired, many of the components shown may be omitted as explained.

This invention is capable of various forms and numerous applications without departing from the essential features herein set forth. It is therefore intended and desired that the embodiments disclosed herein shall be deemed illustrative and not restrictive and that the patent shall cover all patentable novelty herein set forth; reference being had to the following claim rather than to the specific description herein to indicate the scope of this invention.

I claim:

In combination with a die for the continuous extrusion of tubing made of a plasticized material which is pliable when set, means for flattening and closing said tubing at a point spaced from the die where the extruded tubing is already set; said die being provided with a first port and a second port opening into the extruded tubing, a first pipe connected to one of said ports; said first pipe terminating in two branches, a second pipe connected to the other of said ports, a first pump and a second pump, each having an intake port and an exhaust port respectively; one of said branches of the first pipe being connected to the intake port of the first pump; the exhaust port of said first pump being open to the atmosphere; the second of said branches being connected to the intake port of the second pump and said second pipe being connected to the exhaust port of the second pump, two valves, interposed one in each of said branches respectively and a branch in the branch connected to the intake port of said second pump, between said second pump and the valve in said branch connected to the intake port of said second pump and a valve controlling the branch in said branch connected to the intake port of the second pump.

WILLARD J. JOHNSON.

References Cited in the file of this patent

UNITED STATES PATENTS

| Number | Name | Date |
|---|---|---|
| 1,196,648 | Bleeker | Aug. 29, 1916 |
| 1,289,033 | Bradley | Dec. 24, 1918 |
| 1,601,686 | Henderson | Sept. 28, 1926 |
| 2,043,455 | Voss | June 9, 1936 |